United States Patent [19]

Zagefka et al.

[11] Patent Number: 4,496,613

[45] Date of Patent: Jan. 29, 1985

[54] AQUEOUS MEDIA FOR THE TREATMENT OF WOOD AND WOODEN MATERIALS AND A PROCESS FOR SUCH TREATMENT

[75] Inventors: Hans-Dieter Zagefka, Haltern; Wilfried Bartz; Alfred Konietzny, both of Marl, all of Fed. Rep. of Germany

[73] Assignee: Chemische Werke Huels Aktiengesellschaft, Marl, Fed. Rep. of Germany

[21] Appl. No.: 457,551

[22] Filed: Jan. 13, 1983

[30] Foreign Application Priority Data

Jan. 13, 1982 [DE] Fed. Rep. of Germany ....... 3200782

[51] Int. Cl.$^3$ ............................ B05D 1/18; C08F 8/32
[52] U.S. Cl. ................................. 427/440; 106/18.32; 428/541; 525/332.8; 525/333.2
[58] Field of Search ...................... 106/18.32; 427/440; 525/332.8, 333.2; 428/541

[56] References Cited

U.S. PATENT DOCUMENTS 4,269,626  5/1981  Gorke et al. ..................... 106/18.32
4,379,890  4/1983  Konietzny et al. .......... 106/18.32 X

FOREIGN PATENT DOCUMENTS 2911243 10/1980 Fed. Rep. of Germany .

*Primary Examiner*—Michael R. Lusignan
*Attorney, Agent, or Firm*—Millen & White

[57] ABSTRACT

Wood and wooden materials are treated with aqueous treatment media. These media contain a water-soluble or water-dispersible, oxidatively drying, organic binder. The latter is a low-molecular weight, optionally modified 1,3-butadiene polymer which carries quaternary ammonium groups. This polymer is obtained by reacting an epoxy-group-containing polymer with a secondary and/or primary aliphatic amine and reacting the amination product with a low-molecular weight monoepoxide, during which process 0.05–0.5 mole of the quaternizable amino groups is quaternized per 100 g of the amination product.

The treatment media preferably additionally contain wood preservatives and additives customary in the impregnating and varnishing field.

23 Claims, No Drawings

AQUEOUS MEDIA FOR THE TREATMENT OF WOOD AND WOODEN MATERIALS AND A PROCESS FOR SUCH TREATMENT

BACKGROUND OF THE INVENTION

This invention relates to the impregnation treatment of wood and wooden materials.

German Pat. No. 2,838,930 corresponding to U.S. Pat. No. 4,269,626 relates to the field of art of this application. The aqueous coating agents for wood and wooden materials described therein have the drawback that their absorptive power for the biocidally active, inorganic acids and salts customarily utilized as water-soluble wood preservatives is insufficient. This can be because the solubility of these additives in the treatment media is inadequate, or because a coagulation of the binder occurs when trying to achieve the desired concentration of the additives in the treatment media. cf. DOS No. 30 26 300, page 18, Table 3, Impregnating Agents A and B and corresponding portions of equivalent U.S. application Ser. No. 281,796 of July 9, 1981, now U.S. Pat. No. 4,379,890, patented Apr. 12, 1983. The disclosures of these documents are incorporated by reference herein. Accordingly, the wood-protective action attainable using these is in need of improvement.

SUMMARY OF THE INVENTION

Accordingly, it is an object of the present invention to provide a process and agent for the treatment of wood and wooden materials with aqueous treatment media, which permit the transport of the binder contained in the latter and optionally also of any wood preservative contained therein, in a sufficient concentration, deeply into the wood parts to be protected, using conventional treatment procedures, and which fix the wood preservative in that location, i.e., to provide a method for improved wood preservation.

Upon further study of the specification and appended claims, further objects and advantages of this invention will become apparent to those skilled in the art.

These objects have been attained according to this invention by providing a process for the treatment of wood and wooden materials having open pores using aqueous treatment media and conventional methods of impregnating technology, wherein the treatment medium comprises 1. a water-soluble or water-dispersible, oxidatively (e.g., air) drying organic binder based on a low-molecular weight, optionally modified, 1,3-butadiene polymer,
2. an optional wood preservative, and
3. optional conventional additives utilized in the impregnating, varnishing and related fields of art, excluding pore-sealing additives, wherein,
4. the binder is a polymer carrying quaternary ammonium groups obtained by the following manufacturing process which is per se conventional;

4.1 reacting an epoxy-group-containing polymer, wherein the basic polymer is made up of ≧70 mole % 1,3-butadiene monomer and is optionally modified by isomerization, partial cyclization or partial hydrogenation, with a secondary and/or primary aliphatic amine of Formula I

(I)

wherein $R^1$ and $R^2$, independently of each other, each is alkyl, hydroxyalkyl, or alkoxyalkyl, each of 1–7 carbon atoms, the α-position being excluded for either oxy function or $R^1$ has the meaning above and $R^2$ is hydrogen, and 4.2 reacting the resultant amination product with a low-molecular weight monoepoxide so that 0.05–0.5 mole of the quaternizable amino groups is quaternized per 100 g of the amination product.

In addition these objects have been attained by providing the corresponding treatment agent per se.

DETAILED DISCUSSION

Herein, wood preservatives are understood to mean wood-protecting, biocidally active compounds.

This invention involves an impregnation technique for wood and related techniques. In these methods, an effective and long-term wood protection is desired. It is considered important in this context to transport the binder and optionally also the wood preservative, which latter can be a wood preservative mixture having a broad spectrum of effectiveness, deeply into the wood sections to be protected (deep penetration) in a sufficient concentration. If necessary, the wood preservative is fixed in this location. In this procedure, in certain cases, a decorative function can additionally be achieved in the surface of the wood.

This application does not involve the wood varnishing technique. In the latter process, merely a decorative function is attained in the surface of the wood. In no way is there an in-depth effect. Therefore, typical additives for such a process are pigments, rather than wood preservatives. Moreover, in the varnishing technique for wood, it is customary if one skilled in the art sees any danger of breakthrough of the varnishing agent to first close the wood pores by a suitable pretreatment and then to apply the varnishing agent.

It is also customary to take other measures, for example, to use pore-closing additives in the varnishing agent itself. These must also be suitable for adequately sealing the pores. Such steps are omitted in the impregnating technique. In view of this situation, processes for the varnishing of wood with aqueous varnishing agents, even if these contain a binder corresponding to the binder utilized in connection with this application (see, e.g., DOS No. 2,911,243), relate only to remote technology.

The epoxy-group-containing 1,3-butadiene polymers are per se known. They can be produced, for example, from butadiene (co-) polymers, as described, by way of example, in German Pat. Nos. 1,186,631; 1,212,302; 1,241,119; 1,251,537; 1,292,853; 2,029,416; 2,122,956; and in DOS 2,361,782, by means of epoxidation. The basic polymers are optionally modified by isomerization, partial cyclization or partial hydrogenation. All of these disclosures are incorporated by reference herein.

The epoxidation of these polymers can be carried out in a manner known per se, for example by a process as described in German Pat. No. 2,838,930, column 7, last paragraph which process leads to a random distribution of epoxy groups; in this process, vinyl groups are optionally likewise epoxidized. This entire German patent is also incorporated by reference herein.

Another known method for obtaining suitable 1,3-butadiene polymers containing epoxy groups, is by terminal functionalization, with, for example, epichlorohydrin, of polymers obtained in the so-called living polymerization process. Such 1,3-butadiene polymers with terminal-positioned epoxy groups are available commercially.

The content of epoxy oxygen capable of being titrated in these polymers (e.g., per DIN [German Industrial Standard] 16 945) is 3-9 weight percent, preferably 4-8 weight percent.

Suitable basic polymers, forming the foundation for the epoxy-group-containing 1,3-butadiene polymers for the treatment media of this invention are those made up of at least 70 molar percent 1,3-butadiene as monomer. Suitable comonomers include copolymerizable 1,3-diolefins such as isoprene and 1,3-pentadiene. Furthermore suitable as the comonomers are copolymerizable, α-unsaturated monoolefins, such as styrene. However, they are less preferred as comonomers.

The copolymers are made up preferably of at least 90 molar percent 1,3-butadiene monomer, as well as maximally 10 molar percent of the comonomers. Quite especially preferred are homopolybutadienes.

Preferably, less than 40% of the olefinic double bonds are in the trans-structure in the epoxy-group-containing homo- or copolymers. The total content of double bonds correspond to an iodine number of at least 100, preferably $\geq 250$ g iodine/100 g, in order to impart self-curing properties to the thus-produced binders of this invention, for example by the oxidative drying process.

The number-average molecular weight (relative molecular mass, $\overline{M}_n$) of the epoxy-group-containing 1,3-butadiene polymers suitable for preparing the treatment media of this invention is 500-6,000, preferably 1,000-2,500. The value of $\overline{M}_n$ is determined by vapor pressure osmometry.

The amination of the epoxy-group-containing 1,3-butadiene polymers is conventional and disclosed, for example, in German Pat. Nos. 2,732,736; 2,734,413; 2,828,014; 2,838,930; and 2,911,243, all of whose disclosures are incorporated by reference herein. Suitable for this amination are aliphatic secondary and/or primary amines of Formula I:

$$R^1-NH-R^2 \qquad (I)$$

wherein $R_1$ and $R^2$ are as defined above. In this connection, the use of secondary amines is preferred, especially if 1,3-butadiene polymers are used which have a random distribution of epoxy groups.

During the subsequent quaternization, as well as during further processing, it has proved to be advantageous for the sum total of C atoms in both residues $R^1$ and $R^2$ to be $\leq 8$.

Examples of suitable amines include: methylamine, ethylamine, propylamines, butylamines, pentylamines, hexylamines, heptylamines, octylamines, such as n-octylamine or 2-ethylhexylamine; dimethylamine, diethylamine, dipropylamine, di-n-butylamine; monoethanolamine, diethanolamine, 2-hydroxypropylamine, 3-hydroxypropylamine, diisopropanolamine; 2-methoxyethylamine, 3-methoxypropylamine, bis[2-methoxyethyl]amine, or bis[3-methoxypropyl]amine, etc.

Diethanolamine is preferred.

The amount of amine added in total can be equimolar with respect to the content of epoxy groups in the epoxidized polymer. It is also possible to utilize an excess of amine and to again remove the unreacted proportion of amine after the reaction. The amine can also be added in less than a stoichiometric amount (an undersupply) so that several of the epoxide rings remain unreacted.

The content of quaternizable amino groups must be sufficient to produce 0.05-0.5, preferably 0.07-0.25 mole of quaternary ammonium groups per 100 g of binder. Preferably, the content of quaternizable amino groups is 0.075-0.30 mole/100 g.

The quaternization of the aminated polymers, which process is also known per se (see, e.g., DAS No. 2,831,785; DOS No. 2,847,600, Example 2; German Pat. No. 2,911,243, whose disclosures are entirely incorporated by reference herein) takes place according to this invention using low-molecular weight monoepoxides in the presence of water and acid, such as described, for example, in Houben-Weyl, "Methoden der organischen Chemie" [Methods of Organic Chemistry] vol. 11/2:610 et seq. (1958) and vol. 14/2:444 (1963) whose disclosure is incorporated by reference herein.

Low-molecular weight monoepoxides suitable for the quaternization of the amination products correspond to Formula II

$$R^3-CH-CH-R^4 \qquad (II)$$
$$\underset{O}{\diagdown \diagup}$$

wherein $R^3$ and $R^4$, independently of each other, each is hydrogen or an alkyl residue of 1 or 2 carbon atoms optionally substituted by a hydroxy group or a chlorine atom. In this regard, see mentioned U.S. application Ser. No. 281,796, of July 9, 1981, whose disclosure is incorporated by reference herein entirely.

Suitable monoepoxides include, for example, ethylene oxide, propylene oxide, epichlorohydrin, or glycidol. Ethylene oxide is preferred.

The addition of water-compatible, inert organic solvents, such as lower alcohols, is normally unnecessary during this reaction. In certain cases, such an addition, especially in the case of a high solids content, does facilitate the production of an aqueous dispersion of the amination product in order to prepare it for quaternization.

The monoepoxide is used in undersupply (i.e., less than a stoichiometric amount) for the partial quaternization of the quaternizable amino groups, and in a small excess for the quantitative quaternization, under normal circumstances.

Suitable acids used for quaternization with monoepoxides include inorganic or organic acids. Suitable acids include, for example, HF, HCl, HClO$_4$, HNO$_3$, H$_2$SO$_4$, H$_3$PO$_4$, carbonic acid; formic, acetic, propionic, benzoic, salicylic, oxalic, succinic, maleic, phthalic, terephthalic, lactic, tartaric, and p-toluenesulfonic acids, etc.

Depending on the quantity of acid added, suitable pH values can be set in the range of 8 to 1. In this connection, the amino groups not quaternized can likewise be converted into the acid salt form so that the solubility of the polymer in water is increased.

Normally, the quaternized polymers exhibit adequate solubility or dispersing capacity in water if at least 0.05 mole of the tertiary amino groups is quaternized per 100 g of the amination product.

Polymers containing 0.07-0.25 mole of quaternized amino groups per 100 g are preferred.

The polymers of this invention, carrying quaternary ammonium groups, are miscible with water to an unlimited extent, especially in a pH range from 2 to 6. The addition of water-compatible, organic solvents, such as lower alcohols, is usually unnecessary in this connection.

The thus-produced aqueous treatment media can be utilized for various purposes. Due to their unexpectedly high penetrability, they are especially suitable for use as deep-penetrating, depth-active aqueous treatment media for wood and wooden materials.

The pH of the aqueous solution or dispersion is preferably set at 2 to 6 for use of the treatment media according to this invention for wood or wooden materials. Preferably, those acids are utilized for this purpose which have a biocidal activity, such as hydrofluoric, phosphoric, phosphorous, arsenic, benzoic, or salicylic acid, or acids forming complexes with metallic ions, such as tartaric acid or ethylenediaminetetraacetic acid.

Herein, wood preservative is further understood to mean (1) A customary, water-soluble wood preservative (which can be a mixture), (2) an organic wood preservative (which can be a mixture), not water soluble, or (3) a mixture of (1) and (2).

Suitable water-soluble wood preservatives include water-soluble, biocidally active, inorganic salts and acids, such as, for example, alkali metal fluorides, alkali metal arsenates, silicofluorides, hydrogen fluorides, boron compounds (boric acid, borates), and salts or compounds of lead, tin, cadmium, nickel, cobalt, manganese, copper, mercury, chromium, or zinc such a described, for example, in G. Buchwald, "Chemie und Anwendung von Holzschutzmitteln" (Chemistry and application of wood preservatives) in "Chemie der Pflanzenschutz- und Schädlingsbekämpfungsmittel", Vol. 4 (1977), R. Wegler, Springer Verlag, New York, whose disclosure is incorporated by reference herein.

Suitable, water-insoluble wood preservatives include, for example, 2,5-dimethylfuran-3-carboxylic acid N-methoxy-N-cyclohexylamide, tributyltin benzoate, tributyltin naphthenate, γ-hexachlorocyclohexane, pentachlorophenol laurate, 2-mercaptobenzothiadiazole-2, methoxycarbonylaminobenzimidazole, or N,N-dimethyl-N'-phenyl-N'-fluorodichloromethylthiosulfamide. If these compounds exhibit inadequate solubility for their desired content in the aqueous agent, it is possible to add organic, water-compatible solvents, such as lower alcohols (e.g., alkanols) and ketones.

The amount of wood preservative in the aqueous treatment media usually is 0.1-15 wt %, preferably 0.5-10 wt %.

Suitable conventional, optional additives according to component c of the agent of this invention include, for example, a pigment, a pellicle-preventive, a stabilizer, a siccative, a surfactant, a viscosity regulator, an organic water-compatible solvent, etc., or mixtures thereof. Additives of this type can be admixed in quantities usually employed under practical conditions. The type and amount of such additives are dependent in each case on the material to be treated, its usage, as well as the treatment procedure, and they can be readily determined perhaps with a few routine experiments. The amount of an organic watercompatible solvent in the aqueous treatment media usually is <15 wt %. The amount of pigments usually is <35 parts by weight per 100 parts by weight of binder. The amount of a pellicle-preventive, a stabilizer, a siccative, a surfactant or a viscosity regulator in the aqueous treatment media usually is 0.1-10 wt %, preferably 0.5-6 wt %.

The pore-sealing additives excluded from the agents of this invention as noted in the definition of component c above are understood to mean only those which achieve pore closure of the wood when present in adequate, i.e., effective concentrations during the application of the treatment medium. Pore closure is defined functionally as is known to those skilled in the art, i.e., the state of the pores whereby they are insufficiently able to pass applied liquid to achieve the deep penetration needed for the field of this invention.

The treatment media of this invention generally have a binder content of 1-30 weight %, preferably 5-15 weight %, and can be applied in accordance with all conventional prior-art processes (see, e.g., DIN No. 68 800, page 3). In this connection, the protective effect attainable is—as is known to those skilled in the art—narrowly linked with the treatment method.

Especially effective, and thus preferred, is an impregnating process wherein wood and wooden materials are subjected to full impregnation (i.e., impregnation throughout their volumes), optionally under pressure or vacuum.

EXAMPLES

The epoxides set forth in Table 1 are utilized for preparing the binders employed in the treatment media of this invention.

AMINATION

For aminating purposes, the epoxy-group-carrying 1,3-butadiene polymers are conventionally reacted with the primary and/or secondary amines (German Pat. No. 2,838,930, Examples 3-7).

AMINE ADDUCT 1

Under nitrogen, 94.2 parts of epoxidized 1,3-butadiene polymer (epoxide 1) is mixed with 17.5 parts of diethanolamine and made to react under agitation at 190° C. After 6 hours, the amine has been reacted practically quantitatively. The product contains 145 mg atoms of nitrogen per 100 g of adduct and 2.5% of residual epoxy oxygen. The highly viscous product exhibits a pale-yellow coloration.

AMINE ADDUCT 2

The production of the amine adduct 2 takes place analogously to the preparation of amine adduct 1.

TABLE 1

EPOXIDES EMPLOYED

| | Basic Polymer | | | Epoxide | |
| --- | --- | --- | --- | --- | --- |
| | $\overline{M}_n$ (by Vapor Pressure Osmometry) | Iodine Number (g Iodine/100 g) | Double Bond Distribution (IR) 1,4-cis/1,4-trans/Vinyl | Total Oxygen Content (%) | Epoxy Oxygen (DIN 16 945) (%) |
| 1 | 1,700 | 445 | 74/25/1 | 8.0 | 5.9 |
| 2 | 1,700 | 445 | 74/25/1 | 11.4 | 8.1 |

TABLE 1-continued

EPOXIDES EMPLOYED

| | Basic Polymer | | Epoxide | |
|---|---|---|---|---|
| | | | Total | |
| $\overline{M}_n$ (by Vapor Pressure Osmometry) | Iodine Number (g Iodine/100 g) | Double Bond Distribution (IR) 1,4-cis/1,4-trans/Vinyl | Oxygen Content (%) | Epoxy Oxygen (DIN 16 945) (%) |
| 3 | 1,700 | 445 | 74/25/1 | 5.2 | 4.5 |

AMINE ADDUCT 3

At 30° C., 59.7 parts of epoxide 3 is combined with 16.7 parts of a 42.3% strength aqueous dimethylamine solution and 13.6 parts of THF. The mixture is filled into a steel autoclave. After the application of 10 bar $N_2$, the mixture is heated to 150° C. within 2½ hours and left at this temperature for 10 hours. A white emulsion is obtained as the reaction product. The solvents are removed under vacuum. The thus-isolated amine adduct 3 contains 180 mg atoms of nitrogen per 100 g of adduct and has a residual epoxide content of 0.9%.

TABLE 2

Aminated Epoxides (Amine Adducts)

| Amine Adduct | Basic Epoxide | Content of Tertiary Nitrogen* (mg Atom N/100 g) | Residual Epoxy Content (%) |
|---|---|---|---|
| 1 | 1 | 147 (a) | 2.5 |
| 2 | 2 | 280 (a) | 0.9 |
| 3 | 3 | 180 (b) | 0.9 |

*Sample diluted with THF, acidified with aqueous HCl, and titrated with potentiometer with N/10 methanolic KOH.
(a) Aminated with diethanolamine.
(b) Aminated with dimethylamine.

QUATERNIZATION

Product 4

200.7 parts of amine adduct 2 is stirred with 71.1 parts of a 73% aqueous lactic acid, corresponding to a degree of neutralization of about 100%, at 20° C. and combined with 666.4 parts of water. The result is a homogeneous mixture. Then, at this temperature, 33.2 parts of propylene oxide is added with stirring and the mixture is heated for one hour to 70° C. A reaction mixture is obtained which can be diluted with water to form a clear, yellow solution having the following properties:

Dry residue (2 hours at 120° C.): 29.3 g/100 g reaction product.

Amine nitrogen: <5 mmol/100 g reaction product.

Product 5

Under agitation and passing a $CO_2$ stream through the reaction mixture, a low-viscosity, milky homogeneous liquid is obtained from 100 parts of amine adduct 3 and 771 parts of water at 15° C.; a solution of 23.8 parts of ethylene oxide in 105 parts of water is stirred into this liquid. The resultant mixture is introduced into a steel autoclave, $CO_2$ is supplied under pressure of up to 10 bar, and the reaction mixture is heated for 3 hours to 80° C., reaching a pressure of about 20 bar. After cooling and expansion, a pale-yellow, translucent solution is obtained having the following properties:

Dry residue (2 hours at 120° C.): 11.5 g/100 g reaction product.

Amine nitrogen: <4 mmol/100 g reaction product.

Product 6

162 parts of amine adduct 1 is stirred with 29.4 parts of an aqueous 73% lactic acid at 40° C. until a homogeneous mixture is obtained. After the addition of 250 parts of water, 13.8 parts of propylene oxide is added under agitation at this temperature and the mixture heated for 3 hours at 70° C. A reaction mixture is produced which can be diluted to a clear, yellow solution with 200 parts of water.

Dry residue (2 hours at 120° C.): 30.0 g/100 g reaction product.

Amine nitrogen: <2 mmol/100 g reaction product.

PRACTICAL USAGE TESTS WITH TREATMENT MEDIA ACCORDING TO THIS INVENTION.

Preparation of Treatment Media

Treatment Medium I 50 parts of product 4 is diluted with 96.5 parts of water. The resultant treatment medium I has a solids content of 10%.

Treatment Medium II 100 parts of product 5 is diluted with 15 parts of water, resulting in a clear, yellow solution having a solids content of 10%.

Treatment Medium III 137 parts of product 4 is diluted with 244 parts of water. 20.2 parts of $CuSO_4.5H_2O$ is dissolved in the resultant, clear solution. A clear, blue solution is thus obtained (pH=4.4; solids content=13.2%).

Treatment Medium IV 139 parts of product 6 is diluted with 257 parts of water, thus obtaining a clear, yellow solution wherein 20.7 parts of $KHF_2$ (technical grade) is dissolved (pH=3.9; solids content=15.0%).

Comparison Solution A 29.3 parts of amine adduct 1 is agitated at 60° C. with 4 parts of potassium bifluoride (technical grade) (corresponding to a degree of neutralization of about 100%), and diluted with 300 parts of water. A clear, yellow solution of a water-like viscosity is obtained (pH=3.7).

Comparison Solution B 31.5 parts of amine adduct 3 is stirred at 60° C. with 7 parts of a 73% aqueous lactic acid (corresponding to a degree of neutralization of about 100%), and diluted with 278 parts of water. A clear solution results which contains 10% solid matter.

Comparison Solution C 65.0 parts of amine adduct 1 is stirred at 60° C. with 16.3 parts of an approximately 52% aqueous lactic acid (corresponding to a degree of neutralization of about 100%), and diluted with 631 parts of water. 22 parts of $CuSO_4.5H_2O$ is added to the aqueous solution. The clear, blue comparison solution C has a solids content of about 12%.

Absorption Capacity of the Treatment Media for Inorganic Salts and Acids

The additives listed in Table 3 are introduced (in g at 20° C.) in incremental portions into respectively 100 g of the treatment medium until the solubility limit has been reached, the polymeric binder coagulates, or the addition is terminated (characterized by *).

TABLE 3

Absorption Capacity of Treatment Media for Inorganic Salts and Acids

| | Treatment Medium | | For Comparison | |
|---|---|---|---|---|
| | I | II | A | B |
| $H_3BO_3$ | 5.7 | 5.5 | 1.8 | 4.1 |
| $KHF_2$ (techn.) | >9.5* | >9.0* | 4.9 | 5.3 |
| $CuSO_4.5H_2O$ | >16.0* | >15.1* | 3.1 | 3.3 |

Table 3 shows that the absorption capacity for inorganic salts and acids displayed by the treatment media prepared with the binders according to this invention is markedly and unforeseeably improved as compared with the treatment media produced with the binders not in accordance with this invention.

Impregnating Tests

The impregnating tests were conducted with pine sap blocks (14×22×50 mm) in accordance with the full impregnating method (DIN [German Industrial Standard] No. 52 160, pp. 2 and 3). The results are compiled in Table 4.

TABLE 4

Impregnating Tests

| Treatment Medium (1) | Dry Absorption (%) | | Relative Dry Absorption (%) (4) |
|---|---|---|---|
| | In Total (2) | Preservative (3) | |
| Treatment Medium III | 26.5 | 6.4 | 13.0 |
| Treatment Medium IV | 28.3 | 9.4 | 14.9 |
| Comparison Solution C | 15.2 | 2.4 | 11.8 |

Determination of dry absorption and relative dry absorption was made according to the equations:

Dry Absorption (%) = (W−T)/T·100

Relative Dry Absorption (%) = (W−T)/(I−T)·100 wherein
W = weight of wood, impregnated, dried;
T = weight of wood, untreated, dried;
I = weight of wood, impregnated, without drying.

In order to calculate the dry absorption of preservative (column 3), W was determined indirectly by determination of the residual amount of peservative in the treatment medium after impregnation.

As can be seen from Table 4, the relative dry absorption (column 4) for treatment media III and IV corresponds very well to their solids contents. Furthermore, analytic examination of the excess solution used for impregnating the test specimens demonstrates that the composition of the treatment media is not altered by the treatment. It can be seen from this that the binder as well as the biocidally active wood preservative penetrate into the test specimens.

If the wooden blocks impregnated with treatment media III and IV are stacked one on top of the other, they do not stick together along the contact surfaces, i.e. the binder shows the required penetration characteristic and is not deposited on the surface of the test specimens.

If a test block impregnated with treatment medium III is split open, it can be seen that the biocidally active additive (here $CuSO_4$) has completely penetrated through the test specimen.

Corresponding proof can be provided for a test specimen impregnated with the fluoride-containing treatment medium IV (color reaction with ZA reagent; literature: H. Becker: "Über den Nachweis und die Bestimmung von Holzschutzmitteln im Holz" [On Detection and Determination of Wood Preservatives in Wood], Seifen-Öle-Fette-Wachse [Soaps, Oils, Fats, Waxes] 23rd year, No. 26/1967: 1010). Lesser penetration depths are observed in the test specimens impregnated with comparison solution C.

It can furthermore be seen from Table 4 that considerably larger proportions of wood preservatives can be introduced into the test specimens with the treatment media of this invention than with comparison solution C utilized for comparative purposes (column 3).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a deep penetrating aqueous composition for the impregnation treatment of wood or wooden materials having open pores by which the composition may penetrate the wood or wooden material, wherein the composition consists essentially of, a water-soluble or water-dispersible, oxidatively drying, organic binder based on a low-molecular weight, 1,3-butadiene homo- or co-polymer, and an effective amount of a wood preservative but substantially without an effective amount of any pore-sealing additives, and wherein, the binder is a polymer carrying quaternary ammonium groups and is obtained by, reacting an epoxy-group-containing 1,3-butadiene homo- or co-polymer, wherein the basic polymer is made up of ≧70 mole % of 1,3-butadiene monomer units with an amine, and then reacting the product of this amination with a low-molecular weight monoepoxide so that 0.05–0.5 mole of the quaternizable amino groups is quaternized per 100 g of the amination product, the improvement wherein, the amine reacted with the epoxy-group-containing polymer is a secondary or primary aliphatic amine of the formula $$R^1-NH-R^2$$

wherein $R^1$ and $R^2$, independently, each is alkyl, hydroxyalkyl, or alkoxyalkyl, each of 1–7 carbon atoms, the OH or alkoxy substituent not being in the α-position, or $R^1$ has the meaning above and $R^2$ is hydrogen.

2. A composition of claim 1, wherein the titratable amount of epoxy oxygen in said epoxy-containing polymer is 3-9 wt %.

3. A composition of claim 1, wherein the polymer is a 1,3-butadiene copolymer and the comonomer is isoprene or 1,3-pentadiene.

4. A composition of claim 1, wherein the amount of 1,3-butadiene monomer units in the polymer is $\geq 90$ molar %.

5. A composition of claim 1, wherein the amount of 1,3-butadiene monomer units in the polymer is 100 molar %.

6. A composition of claim 1, wherein the total content of double bonds in the epoxy-containing polymer corresponds to an iodine number of at least 100 g I/100 g of polymer and less than 40% of the olefinic double bonds are trans.

7. A composition of claim 1, wherein the number average molecular weight of the epoxy group containing polymer is 500-6000.

8. A composition of claim 1, wherein said amine is a secondary amine.

9. A composition of claim 1, wherein said amine is of 1-8 C-atoms.

10. A composition of claim 1, wherein said amine is methylamine, ethylamine, a propylamine, a butylamine, a pentylamine, a hexylamine, a heptylamine, an octylamine, dimethylamine, diethylamine, dipropylamine, di-n-butylamine, monoethanolamine, diethanolamine, 2-hydroxypropylamine, 3-hydroxypropylamine, diisopropanolamine, 2-methoxyethylamine, 3-methoxypropylamine, bis[2-methoxyethyl]amine, or bis[3-methoxypropyl]amine.

11. A composition of claim 1, wherein said amine is diethanolamine.

12. A composition of claim 1, wherein the content of quaternizable amino groups in said amination product is sufficient to produce 0.07-0.25 mole of quaternary ammonium groups/100 g of binder.

13. A composition of claim 1, wherein said monoepoxide is of the formula

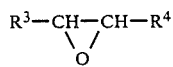

wherein $R^3$ and $R^4$, independently of each other, each is hydrogen or an alkyl residue of 1 or 2 carbon atoms optionally substituted by a hydroxy group or a chlorine atom.

14. A composition of claim 13, wherein the monoepoxide is ethylene oxide, propylene oxide, epichlorohydrin, or glycidol.

15. A composition of claim 1, wherein the binder contains 0.07-0.25 mole of quaternized amino groups/100 g of binder.

16. A composition of claim 1 further comprising a biocidal acid and having a pH of 2-6.

17. A composition of claim 1, further comprising a wood preservative which is hydrofluoric, phosphoric, phosphorous, arsenic, benzoic, salicylic, tartaric or ethylenediaminetetraacetic acid; an alkali metal fluoride; an alkali metal arsenate; a silicofluoride; boric acid; a biocidal, composition-compatible hydrogen fluoride, borate, or salt or compound of lead, tin, cadmium, nickel, cobalt, manganese, copper, mercury, chromium or zinc; or 2,5-dimethylfuran-3-carboxylic acid N-methoxy-N-cyclohexylamide, tributyltin benzoate, tributyltin naphthenate, γ-hexachlorocyclohexane, pentachlorophenol laurate, 2-mercaptobenzothiadiazole-2, methoxycarbonylaminobenzimidazole, or N,N-dimethyl-N'-phenyl-N'-fluorodichloromethylthiosulfamide.

18. A composition of claim 1 further comprising a pigment, a pellicle-preventive, a stabilizer, a siccative, a surfactant, a viscosity regulator, or an organic water-compatible solvent.

19. A composition of claim 1, wherein the binder content is 1-30 wt %.

20. A composition of claim 1 wherein said basic polymer is modified by isomerization, partial cyclization or partial hydrogenation.

21. In a method of deeply penetrating wood or a wooden material by applying thereto an impregnation composition consisting essentially of a wood preservative and a water-soluble or water-dispersible, oxidatively drying, organic binder based on a low-molecular weight, 1,3-butadiene homo- or co-polymer, wherein the wood or wooden material has open pores by which the composition may penetrate the wood or wooden material, the improvement wherein the binder is a polymer carrying quaternary ammonium groups and is obtained by, reacting an epoxy-group-containing, 1,3-butadiene homo- or co-polymer, wherein the basic polymer is made up of $\geq 70$ mole % of 1,3-butadiene monomer units with an amine, and then reacting the product of this amination with a low-molecular weight monoepoxide so that 0.05-0.5 mole of the quaternizable amino groups is quaternized per 100 g of the amination product, and wherein the amine reacted with the epoxy-group-containing polymer is a secondary or primary aliphatic amine of the formula

wherein $R^1$ and $R^2$, independently, each is alkyl, hydroxyalkyl, or alkoxyalkyl, each of 1-7 carbon atoms, the OH or alkoxy not being in the α-position, or $R^1$ has the meaning above and $R^2$ is hydrogen.

22. A method of claim 21 comprising applying this composition to the wood or wooden material in such a manner that it impregnates the entire volume of the wood or wooden material.

23. A method of claim 21 wherein said basic polymer is modified by isomerization, partial cyclization or partial hydrogenation.

* * * * *